US012222661B2

(12) United States Patent
Kishi et al.

(10) Patent No.: US 12,222,661 B2
(45) Date of Patent: Feb. 11, 2025

(54) DEVELOPING APPARATUS HAVING REGULATING BLADE WITH SPECIFIC SURFACE PROPERTIES, PROCESS CARTRIDGE AND IMAGE FORMING APPARATUS

(71) Applicant: CANON KABUSHIKI KAISHA, Tokyo (JP)

(72) Inventors: Yosuke Kishi, Shizuoka (JP); Kazuaki Iwata, Shizuoka (JP); Minoru Ito, Shizuoka (JP); Masaru Kobayashi, Kanagawa (JP); Junji Seki, Kanagawa (JP); Hiroaki Onuma, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/533,374

(22) Filed: Dec. 8, 2023

(65) Prior Publication Data

US 2024/0201615 A1 Jun. 20, 2024

(30) Foreign Application Priority Data

Dec. 15, 2022 (JP) ................................ 2022-200126

(51) Int. Cl.
*G03G 15/08* (2006.01)
*G03G 21/18* (2006.01)

(52) U.S. Cl.
CPC ..... *G03G 15/0812* (2013.01); *G03G 21/1814* (2013.01); *G03G 2215/0866* (2013.01)

(58) Field of Classification Search
CPC .................. G03G 15/0812; G03G 2215/0866
USPC .................................................. 399/274, 284
See application file for complete search history.

(56) References Cited

U.S. PATENT DOCUMENTS

| | | | | |
|---|---|---|---|---|
| 8,095,050 | B2 | 1/2012 | Iwata et al. | |
| 2007/0059049 | A1* | 3/2007 | Onuma | G03G 15/0812 399/284 |
| 2007/0065185 | A1* | 3/2007 | Hasegawa | G03G 15/0812 399/274 |
| 2007/0297822 | A1* | 12/2007 | Yoshida | G03G 9/1133 399/59 |

FOREIGN PATENT DOCUMENTS

| | | |
|---|---|---|
| JP | 2004-117919 A | 4/2004 |

* cited by examiner

*Primary Examiner* — Robert B Beatty
(74) *Attorney, Agent, or Firm* — Venable LLP

(57) ABSTRACT

A developing apparatus includes a developer bearing member; and a regulating member configured to come in contact with the developer bearing member, and regulate the thickness of the layer of the developer. The contact surface of the regulating member with the developer bearing member satisfies $3 \leq Rz < 20$ (μm), $30 \leq Sm \leq 100$ (μm), and $Vmp \geq 0.05$ ml/m$^2$ where Rz represents a maximum height roughness, and Sm represents an average interval of unevenness, and Vmp represents a volume in an initial state of a protruding peak part in parameters in a three-dimensional surface roughness defined in ISO 25178.

7 Claims, 11 Drawing Sheets

DEVELOPING APPARATUS HAVING REGULATING BLADE WITH SPECIFIC SURFACE PROPERTIES, PROCESS CARTRIDGE AND IMAGE FORMING APPARATUS

BACKGROUND OF THE INVENTION

Field of the Invention

The present invention relates to a developing apparatus, a process cartridge, and an image forming apparatus.

Description of the Related Art

With an image forming apparatus using an electrophotographic technology, a light corresponding to image data is applied to an electrophotography photosensitive body (photosensitive body), thereby forming an electrostatic image (latent image). Then, the electrostatic image is supplied with a toner of a developer, which is a recording material, from a developing apparatus, thereby being visualized as a toner image. The toner image is transferred to a recording material such as recording paper from the photosensitive body by a transfer apparatus. The toner image is fixed onto the recording material with a fixing apparatus, resulting in formation of a recording image.

As for a developing apparatus using a dry mono-component developing method, various apparatuses have been proposed. For example, following ones may be mentioned. A magnetic mono-component developer (magnetic toner) is borne on a developing sleeve as a developer bearing member, thereby forming a uniform toner layer by a layer thickness regulating member. The developing sleeve is brought into close vicinity to or contact with the photosensitive body. Then, the developing sleeve is applied with a developing bias voltage including an alternating current component and a direct current component, thereby causing a potential difference between the electrostatic image on the photosensitive body and the developing sleeve. Thus, the toner is moved to the electrostatic image, thereby performing development.

The characteristics of the regulating blade as the layer thickness regulating member are prescribed by the layer thickness and the charging amount of the developer borne by the developing sleeve. Specifically, the developer charging amount (Q/M) per unit mass and the developer amount (M/S) per unit area are used. With a recent trend toward a higher image quality and a higher speed, the developer is required to be borne thinly and uniformly with a uniform charging amount on the developing sleeve surface. The characteristics strongly depends upon the physical shape of the regulating blade such as the surface roughness so long as the shape, the material, the surface property of the developing sleeve, and the electrophotography process conditions are constant. Whether such factors are controlled for allowing the prescribed developing characteristics to be exhibited is the important point for the layer thickness regulating member.

Under such circumstances, Japanese Patent Application Publication No. 2004-117919 proposes that roughening is performed so that at least the electric charge applied surface of the layer thickness regulating member may have a surface roughness Rz of at least 1 μm and not more than 20 μm.

SUMMARY OF THE INVENTION

However, only regulation of Rz of the roughness in the vertical direction of the electric charge applied surface of the layer thickness regulating member cannot regulate the uniformity of the roughness of the surface. Thus, it has been difficult to form a uniform thin layer of the developer on the developer bearing member surface. As a result, melt adhesion of the developer was observed on the developer bearing member surface, and image streaks might occur.

The present invention was completed in view of the foregoing problem. It is an object of the present invention to provide a regulating blade capable of suppressing melt adhesion of a toner onto a developing sleeve in a developing apparatus for use in an image forming apparatus, and stabilizing the image quality.

The present invention provides a developing apparatus comprising:

- a developer bearing member configured to bear a developer; and
- a regulating member configured to come in contact with the developer bearing member, and regulate a thickness of a layer of the developer borne on the developer bearing member, wherein $$3 \leq Rz < 20\ (\mu m),$$

$$30 \leq Sm \leq 100\ (\mu m), \text{ and}$$

$$Vmp \geq 0.05\ \text{ml/m}^2 \text{ are satisfied}$$

where Rz represents a maximum height roughness, and Sm represents an average interval of unevenness in a portion of a surface of the regulating member that comes in contact with the developer bearing member, and Vmp represents a volume in an initial state of a protruding peak part in parameters in a three-dimensional surface roughness defined in ISO 25178.

As described up to this point, the present invention enables provision of a regulating blade capable of suppressing melt adhesion of a toner onto a developing sleeve in a developing apparatus for use in an image forming apparatus, and stabilizing the image quality.

Further features of the present invention will become apparent from the following description of exemplary embodiments with reference to the attached drawings.

DESCRIPTION OF THE EMBODIMENTS

Below, referring to the accompanying drawings, preferred examples of the present invention will be described exemplarily and in details. However, the dimensions, the materials, and the shapes of the constituent components described in the following examples, the relative layout thereof, and the like should be appropriately changed according to the configurations and various conditions of the apparatuses to which the present invention is applied. Therefore, they are not intended to restrict the scope of the present invention unless otherwise specified. Examples describe a plurality of features. All the plurality of features are not necessarily essential for the invention, and the plurality of features may be arbitrarily combined.

EXAMPLES

Overall Configuration of Image Forming Apparatus

Figure 1:
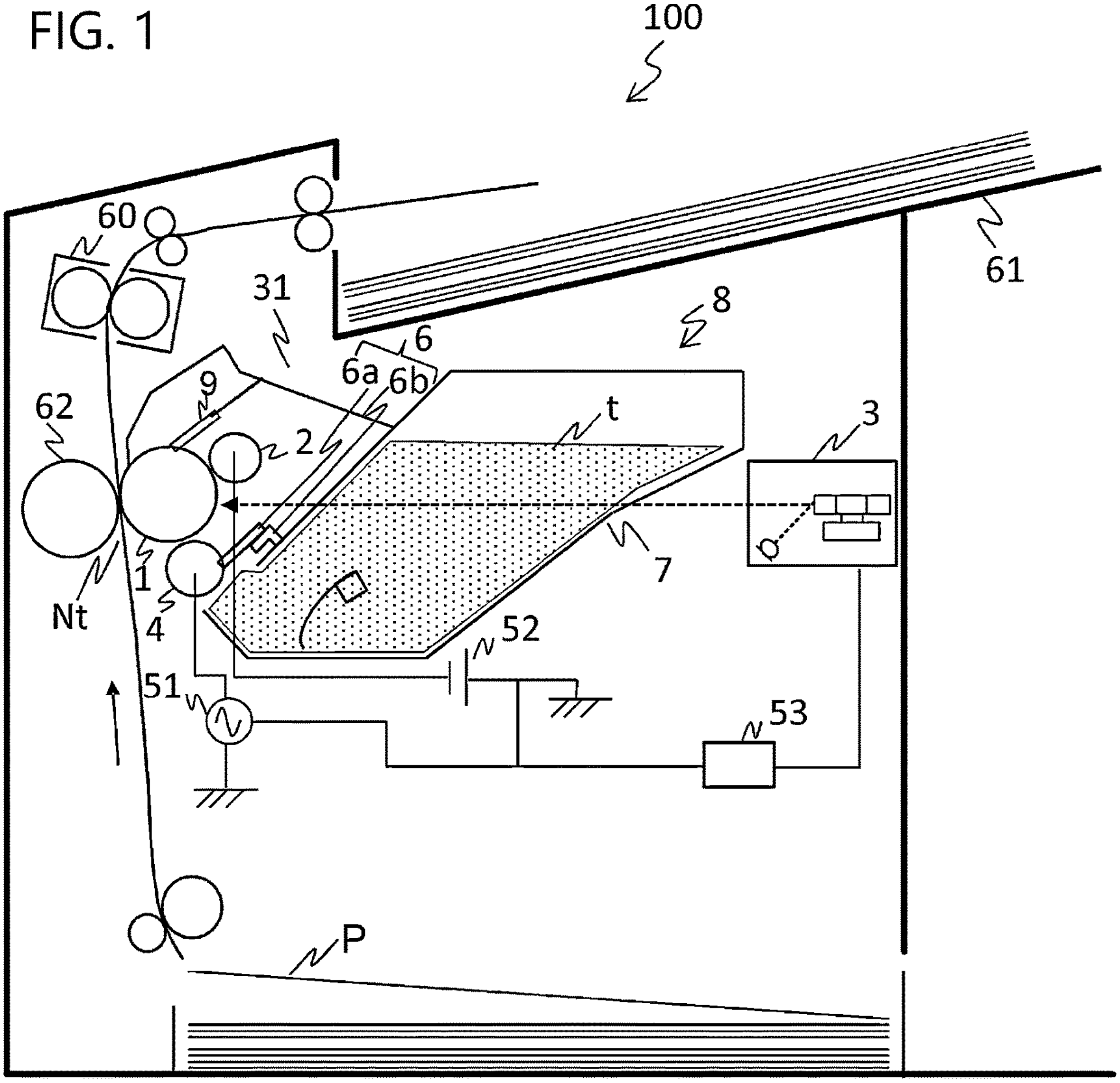
FIG. 1 is a schematic structural cross sectional view of an image forming apparatus in accordance with Example.

FIG. 1 shows an image forming apparatus 100 in accordance with Example of the present invention. First, the overall configuration of the image forming apparatus 100 will be described. The image forming apparatus is a monochrome laser printer using a direct transfer system. The image forming apparatus 100 can form a monochrome image on a recording material (e.g., recording paper) in response to image information.

The image forming apparatus 100 includes a photosensitive drum 1 as an image bearing member, a charging roller 2 of a contact charging member for uniformly charging the surface of the photosensitive drum 1, and an exposure apparatus 3 for exposing the surface of the charged photosensitive drum 1 to a laser light, and thereby forming an electrostatic latent image. For the photosensitive drum 1, there is used an organic photosensitive drum sequentially coated with an undercoat layer, a carrier generation layer, and a carrier transport layer of functional films on the outer circumferential surface of a cylinder made of aluminum.

The charging roller 2 of a charging roller is drivenly rotated by bringing the roller part of conductive rubber into pressure contact with the photosensitive drum 1. The core metal of the charging roller 2 is applied with a prescribed direct current voltage from a direct-current power supply 52 as a charging bias. As a result of this, a uniform dark part potential (Vd) is formed on the surface of the photosensitive drum 1. The spot pattern of the laser light emitted in response to image data by a laser light from the exposure apparatus 3 exposes the photosensitive drum 1 to the light, and at the exposed segment, the electric charges on the surface disappear by the carriers from the carrier generation layer, resulting in reduction of the electric potential. As a result of this, on the photosensitive drum 1 the electrostatic latent image of a prescribed bright part potential (Vl) is formed at the exposed segment, and the electrostatic latent image of a prescribed dark part potential (Vd) is formed at the unexposed segment.

A developing sleeve 4 for developing an electrostatic latent image formed on the photosensitive drum 1 is included, and a regulating blade 6 is configured which comes in counter-contact with respect to the rotation direction of the developing sleeve 4, and performs coat amount regulation and electric charge application. In the present Example, a toner to be negatively charged by triboelectric charging was used. However, the present invention is not limited thereto.

In the present Example, the developing sleeve 4 is applied with a developing bias including an alternating voltage superimposed on a direct-current voltage under an instruction from a CPU 53 by a high pressure power supply 51. An electric field is generated between the photosensitive drum 1 and the developing sleeve 4. For this reason, the action of the electric field causes the charged toner t to be deposited as a toner image corresponding to the electrostatic latent image on the photosensitive drum 1 surface. The toner image formed on the photosensitive drum 1 is transferred onto a sheet material P of a recording material by a transfer roller 62 at a transfer nip Nt.

On the other hand, after transfer of the toner image onto the sheet material P, the untransferred toner left on the surface of the photosensitive drum 1 is removed by a cleaning blade 9 as a cleaning member. Then, the photosensitive drum 1 is charged by the charging roller 2 again, to be used for image formation.

The photosensitive drum 1, the charging roller 2, and the cleaning blade 9 are integrated to configure a cleaning unit 31. The developing sleeve 4 and the regulating blade 6 are integrated to configure a developing apparatus 7. Then, the cleaning unit 31 and the developing apparatus 7 are integrated to be configured as a process cartridge 8, which is detachable with respect to the apparatus main body of the image forming apparatus 100. Then, on the downstream side of the transfer nip part, and above the photosensitive drum 1, a fixing apparatus 60 for heating and fixing the unfixed toner image transferred onto the sheet material P is provided. On the apparatus upper surface, a paper output part 61 for receiving the sheet material P discharged from the fixing apparatus 60 is provided.

Regulating Blade

A description will be given to a manufacturing method and a material for a developer amount regulating blade (a regulating blade 6, a layer thickness regulating member, or a developer regulating member), and the like. The regulating blade 6 generally includes a blade support member **6*b* having rigidity such as a steel sheet, a blade member 6*a* having rubber elasticity, and an adhesive layer. Respective materials have no particular restriction. As the blade support member 6*b*, mention may be made of the one obtained by processing a surface treated steel sheet by a chromate treatment, a lubricating resin, and the like, phosphor bronze, an elastic metal sheet such as a spring steel, a molded product of plastic, ceramics, or the like, or other articles. Further, as the blade member 6*a* having rubber elasticity, mention may be made of thermosetting polyurethane, silicon rubber, a liquid rubber, or the like. In the present Example, thermosetting polyurethane was used as the blade member 6*a***.

Method for Manufacturing Blade Member

Figure 2:
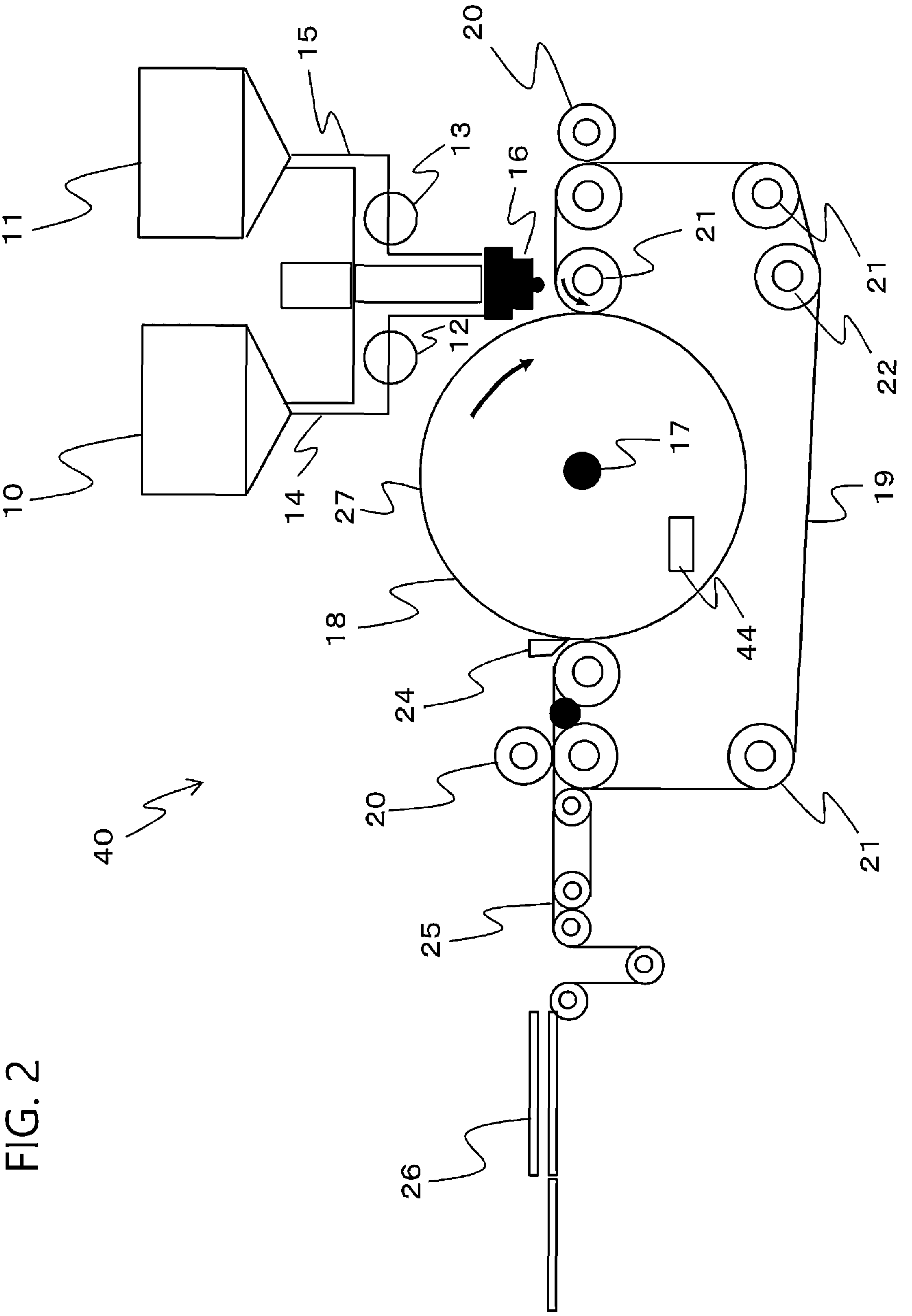
FIG. 2 is a schematic view of a blade member manufacturing apparatus in accordance with Example.

Below, an embodiment of the method for manufacturing a blade member **6*a* of the present invention will be described together with the manufacturing apparatus. FIG. 2 is a schematic view showing one example of a manufacturing apparatus 40** of a blade member for an electrophotographic apparatus.

Weighing/Mixing/Stirring

First, a polyurethane composition is weighed, and mixed with stirring, thereby preparing a mixture by a mixing stirring apparatus. The mixing stirring apparatus may be a part of the manufacturing apparatus 40, or may be a separate apparatus. As shown in FIG. 2, the mixing stirring apparatus includes at least two tanks 10 and 11. The outlets of the tanks 10 and 11 are connected with a mixing head 16 through discharging/circulating pipings 14 and 15, respectively. The discharging/circulating pipings 14 and 15 are provided with weighing pumps 12 and 13, respectively. Incidentally, the mixing head 16 includes a known structure including a stirring rotor in a chamber having an introduction port and a discharge port of a liquid substance, and can discharges a polyurethane composition with high precision. The mixing stirring apparatus uses such a weighing mixing machine, and supplies to the mixing head 16 a given amount of each composition by the weighing pumps 12 and 13, and performs mixing with stirring uniformly.

Introduction

Figure 3:
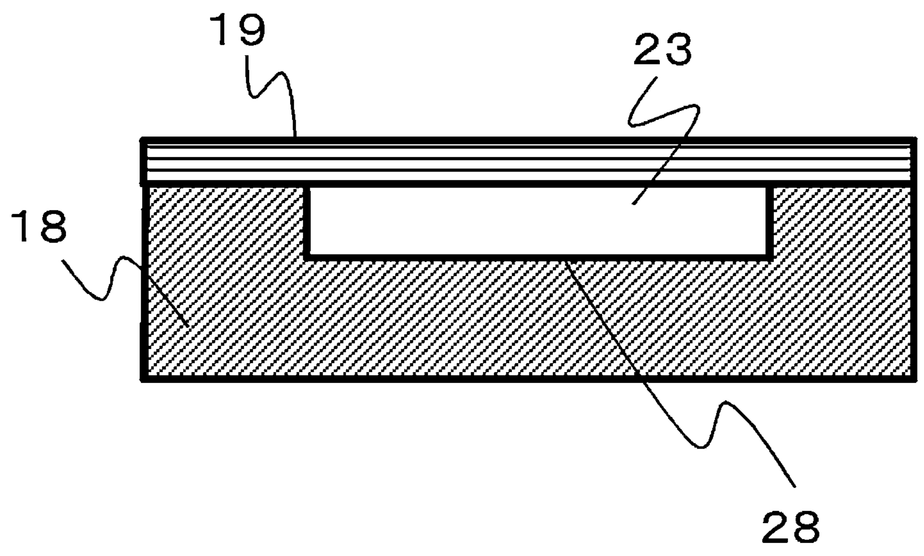
FIG. 3 is a groove shape cross sectional view of a forming drum.

The manufacturing apparatus 40 includes a forming drum 18 having a forming groove of the blade member 6*a* at the outer circumferential surface, and an endless belt 19 arranged so as to cover the forming groove at a part of the outer circumferential surface of the forming drum 18. The forming groove at the outer circumferential surface of the forming drum 18 is provided so as to be continuous in the rotation direction. The manufacturing apparatus 40 also includes a heating means 44. The heating means 44 is included in the forming drum 18, or is arranged at a position close thereto, or in intimate contact or in close vicinity to the endless belt 19 side of the pressure welded portion of the forming drum 18 and the endless belt 19. The heating means 44 can heat and cure a polyurethane composition introduced into the forming groove in a space part 23 surrounded by the forming groove on the forming drum 18 and the endless belt 19 as shown in FIG. 3.

The forming drum 18 includes, for example, hard aluminum, iron, or stainless-steel. The central part of the forming drum 18 is rotatably supported by a horizontal rotation shaft 17, and is rotated at a prescribed speed by a driving apparatus. The shape of the forming groove formed continuously with the outer circumferential surface of the forming drum 18 is appropriately selected in accordance with the shape of the blade member 6*a* for the electrophotographic apparatus to be manufactured.

Further, although described in details later, the contact position surface of the regulating blade 6 with the developing sleeve 4 is formed in a shape in which the surface unevenness of the forming groove surface part (mold release surface) 28 of the forming drum 18 is printed. In other words, the mold release surface 28 of the forming drum 18 performs surface roughening processing for forming the regulating blade surface in a prescribed shape.

The endless belt 19 includes, for example, a metal strip of stainless steel, or the like. A resin belt other than stainless steel may be used. However, even in that case, a means capable of heating from the outside of the belt is preferably used.

The endless belt 19 is extended across a driving roll 20 having a different driving mechanism from that of the forming drum 18, a guide roll 21 for adjusting endless belt running, and a tension roll 22 for applying the endless belt 19 with a tension. The forming drum 18 and the endless belt 19 are rotated at the equal peripheral speed.

Further, separation of the driving means of the forming drum 18 and the endless belt 19 can reduce the load of the tension of the endless belt 19, and hence is preferable. As the driving means, for example, use of a combination of a motor, a clutch, a brake, and the like can be considered. However, in order to make the tensions of the forming drum 18 and the endless belt 19 constant in accordance with the peripheral speed of the forming drum 18, preferably, the forming drum 18 is driven by a motor, and the endless belt 19 is driven by a powder brake and a motor.

The heating method by the heating means 44 includes a heating method from the outside or the inside of the forming drum 18. However, the heating method from the outside is affected by disturbance (such as room temperature). For this reason, inside heating of directly heating the forming drum 18 is preferable. The means for performing inside heating includes a means such as a heater, oil, or water. From the viewpoints of space saving and temperature control, a heater is optimum.

In the manufacturing apparatus 40 shown in FIG. 2, the mixing head 16 of a raw material arranging means is provided with a discharge port capable of discharging a polyurethane composition at a prescribed speed. The polyurethane composition in the mixing head 16 is discharged through the discharge port, and is arranged onto the endless belt 19. At this step, the forming drum 18 and the endless belt 19 are rotated at a prescribed speed, and a necessary amount thereof corresponding to the space part (groove) formed by the forming drum 18 and the endless belt 19 is continuously introduced.

The polyurethane composition in accordance with the present invention is promoted to undergo a curing reaction by heating. The polyurethane composition is first introduced onto the endless belt 19 not having a heating mechanism. For this reason, at that time point, an urethane polymerization reaction to be accelerated by a heat does not proceed. Then, after the endless belt 19 comes in contact with the heated forming drum 18, the contact surface rises in temperature immediately. Then, when the polyurethane composition introduced onto the endless belt 19 is moved and filled in the forming groove on the forming drum 18, heating and pressurizing are started, so that the urethane polymerization reaction is started. As a result of this, the polyurethane composition can be cured evenly and uniformly. Incidentally, when the polyurethane composition is introduced into the groove portion on the forming drum 18, curing proceeds from the initial contact surface. For this reason, curing proceeds ahead at only the forming drum 18 contact surface. As a result, uneven curing is caused between the forming drum 18 contact surface and the endless belt 19 contact surface, resulting in occurrence of ununiformity in the surface pattern and the physical properties. Incidentally, the portion not in contact with the forming drum 18 may be provided with a cooling mechanism for cooling the endless belt 19.

Curing

Then, while filling the space part 23 including the forming groove of the forming drum 18 and the endless belt 19 with the polyurethane composition, heating and curing are performed for a prescribed time. As a result of this, the urethane polymerization reaction of the polyurethane composition is completed to a degree capable of mold release from the forming drum 18 and the endless belt 19. As a result, a prototype body of the blade member 6*a* for an electrophotographic apparatus having necessary width and thickness, and surface properties is continuously formed.

Incidentally, in the present Example using the manufacturing apparatus 40 shown in FIG. 2, the heating temperature is preferably about 80 to 200° ° C. The time taken for the polyurethane composition enough to be able to be mold released from the forming drum 18 and the endless belt 19 due to proceeding of the urethane polymerization reaction is from 20 seconds to 90 seconds. However, when curing is completed to the extent that mold release is possible from the forming drum 18 and the endless belt 19, it is possible to perform mold release. For this reason, the heating temperature and the heating time can be appropriately selected according to the composition of the polyurethane composition, and the configuration of the manufacturing apparatus.

Mold Release/Cutting

The polyurethane resin which has thus completely gone through the heating and curing is mold released from the forming drum 18 and the endless belt 19 by a mold release means 24. The mold released polyurethane resin is transported by a transport mechanism 25, and is cut into prescribed dimensions by a cutting mechanism 26. For cutting, the suitable one may be selected from known methods such as NC cutting by a cutting instrument, and punching mold.

Configuration for Mold Release Treatment

The forming drum 18 is desirably subjected to a mold release treatment at at least the portion to be brought into contact with the polyurethane composition, for example, the forming groove. As the mold release treatment, mention may be made of a method for applying a release agent to a mold surface using a release agent treatment apparatus, or the like, a method for subjecting the surface of the forming drum 18 to a plating treatment such as PTFE, fluorine-containing plating, a method for coating a resin having releasability such as silicon, or the like. However, the present invention is not limited thereto. The suitable one may be selected so long as it can perform mold release of an urethane resin. Further, the endless belt 19 is also desirably subjected to a mold release treatment at at least the portion to be brought into contact with the polyurethane composition. The method of the mold release treatment may be the same method as that of the mold release treatment to be performed on the forming drum 18.

Surface Roughening

For the regulating blade 6 in accordance with the present invention, a roughened portion is desirably formed at at least the portion to be brought into contact with the developing sleeve 4. Incidentally, the regulating blade 6 is a blade-shaped member for regulating the developer amount so as to form a uniform thin layer shape while triboelectrically charging the developer between it and the developing sleeve 4 of the developer bearing member in the image forming apparatus.

Conventionally, it has been considered that a more smooth electric charge controlled surface of the regulating blade 6 is better for uniformly charging and transporting a developer particle. However, in recent years, a close study on the effects of the flatness of the electric charge controlled surface exerted on uniform charging and transport of the developer revealed the following. Roughening of the developer controlled surface to some extent can achieve uniform charging and transport of the developer, and suppresses image defects such as image streaks and uneven image.

Therefore, the roughened portion is preferably formed in at least a corner of the bottom surface in the cross section orthogonal to the longitudinal direction of the forming groove of the forming drum 18 in accordance with present invention. As a result of this, at least the portion of the manufactured regulating blade 6 to be brought into contact with the developing sleeve 4 is roughened. For this reason, it is possible to implement uniform charging and transport of the developer.

Examples of the method for forming the roughened portion may include a method for roughening by a physical procedure. Specific examples of the physical procedure may include a method for roughening the forming drum 18 surface using sandpaper or a roughening film, a method for setting the roughening members in the forming groove, and a shot blast method such as a sandblast method. Other than these, the method has no restriction so long as it can perform roughening.

As the roughening microscopic particles of the formed surface with the shot blast method, there can be used silica ($SiO_2$), alumina ($Al_2O_3$), silicon carbide (SiC), magnetite ($Fe_3O_4$), titanium oxide ($TiO_2$), tin oxide ($SnO_2$), inorganic fine particles, organic fine particles, inorganic/organic hybrid fine particles, or the like. Two or more thereof can be used in combination, if required.

Figure 4:
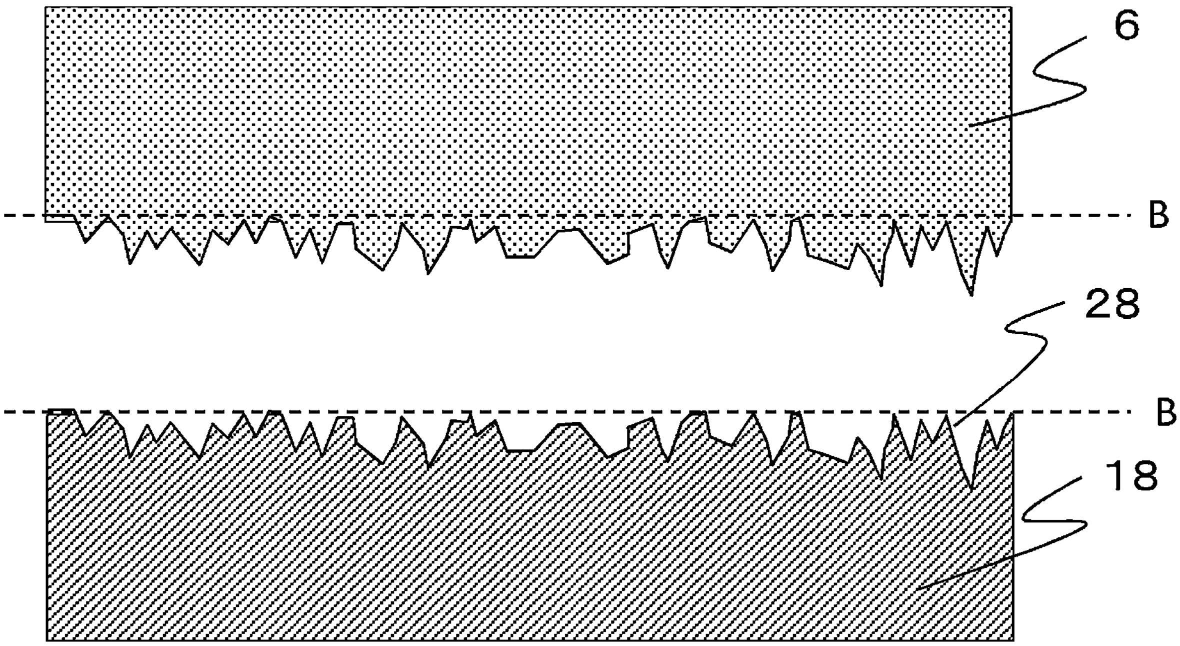
FIG. 4 is a schematic view of rough surface formation of the regulating blade in accordance with Example 1.

In the present Example, there was used the method for roughening the mold release surface 28 on the forming drum with the shot blast method. When the regulating blade 6 is manufactured using such a forming drum 18, as shown in FIG. 4, the surface shape of the regulating blade 6 is formed in such a manner as to correspond to the shape of the mold release surface 28 on the forming drum 18 of a die. Herein, each height of the mold release surface 28 and the regulating blade 6 when the regulating blade 6 is manufactured using the mold release surface 28 before surface roughening is indicated with a broken line B. The surface of the regulating blade 6 formed using the roughened mold release surface 28 is in a surface shape having unevenness in the convex direction with respect to the broken line B (the normal direction to the mold release surface and the surface of the regulating blade).

Figure 5:
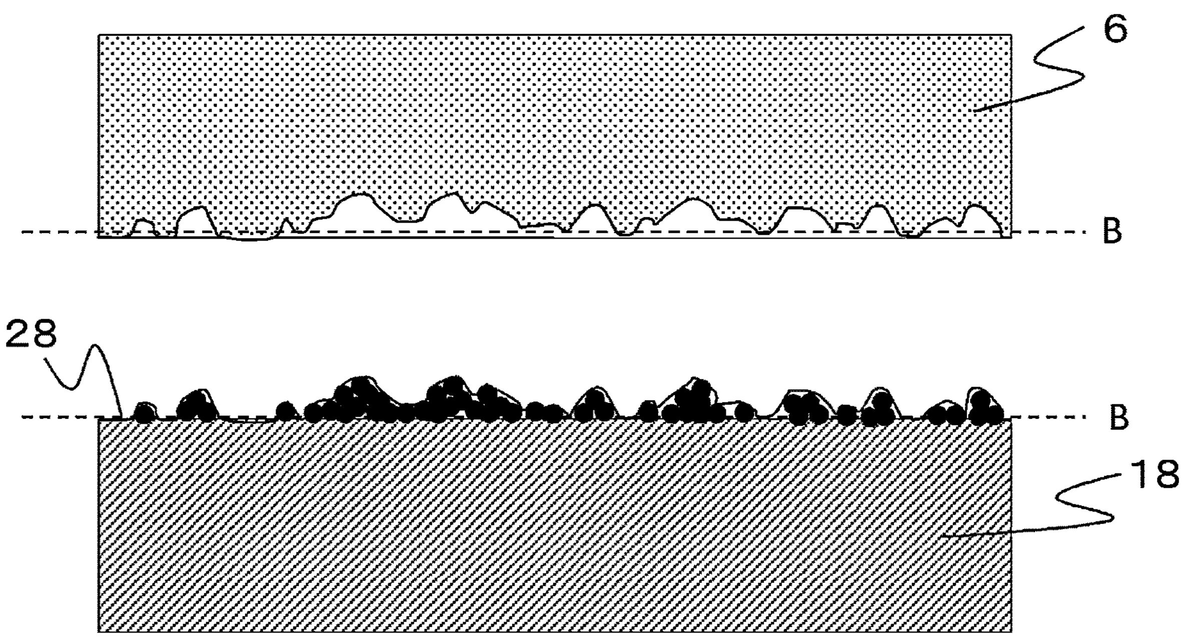
FIG. 5 is a schematic view of rough surface formation of a regulating blade in accordance with Comparative Example 1.

Further, although described later in Comparative Example 1, FIG. 5 shows the state in which the surface shape of the regulating blade 6 is formed not with the method for subjecting the mold release surface 28 of the forming drum 18 to a roughening treatment, but with the method for spraying particles onto the die (the forming drum 18). With the method, unevenness in the concave direction with respect to the broken line B of the height of the original mold release is formed on the surface of the regulating blade 6.

Measurement Method of Maximum Height Roughness Rz of Regulating Blade Surface, and Average Interval of Unevenness Sm The maximum height roughness (Rz) and the average interval of unevenness (Sm) of the surface shape subjected to a roughening treatment of the regulating blade 6 thus formed were measured according to JIS B 0601 using a surface roughness measuring machine SE3500 (manufactured by Kosaka Laboratory Ltd.).

Measurement length: 4.0 mm

Cut off: 0.8 mm

Measurement speed: 0.1 mm/sec

With the line roughness measuring mode, four straight lines were drawn in a given horizontal direction, and four straight lines were drawn in a given vertical direction. The two upper and lower limit values of 8 values obtained from the total of 8 straight lines were excluded, and the average was taken from the remaining 6 values. The resulting value was used.

Figure 6:
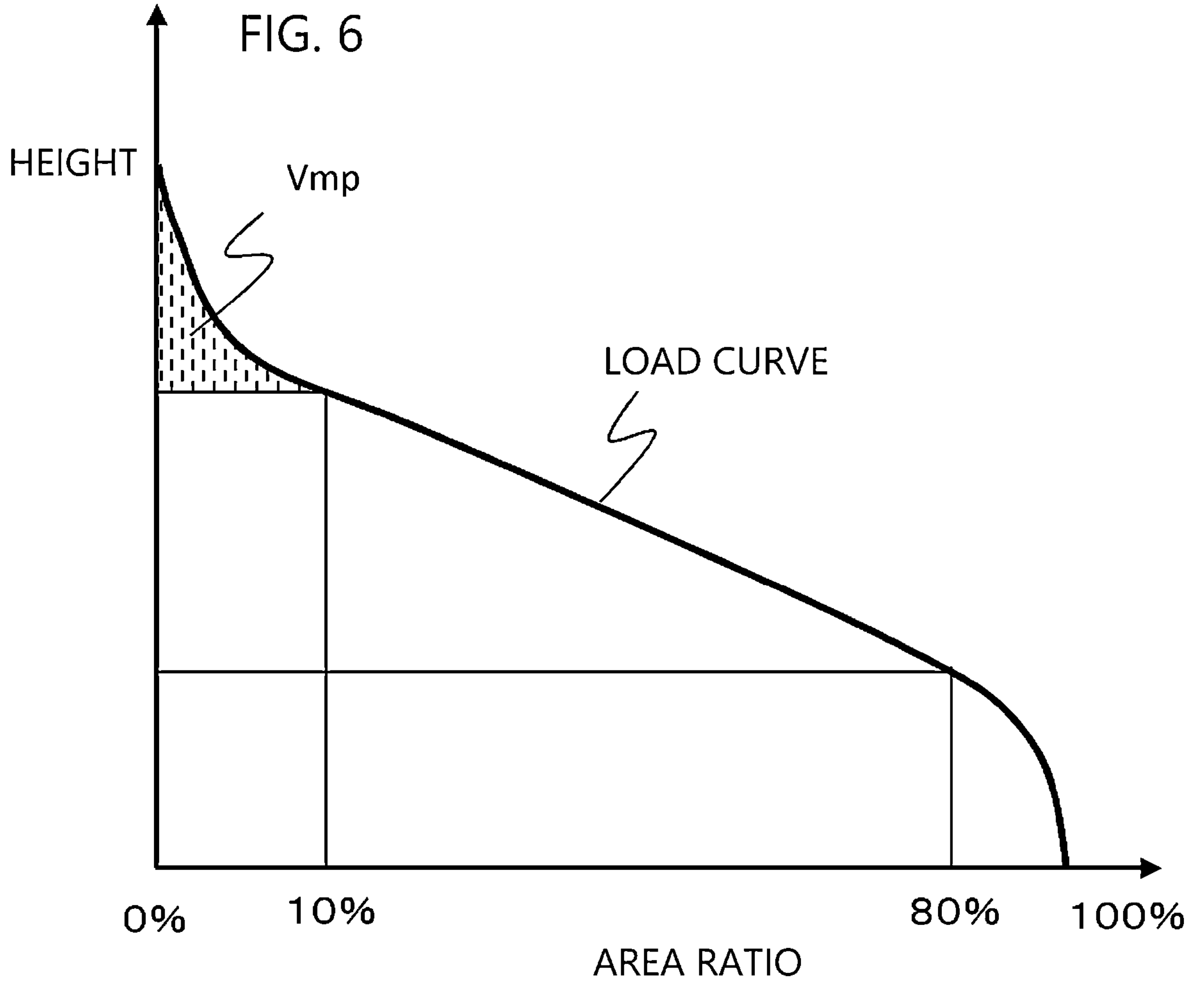
FIG. 6 is an explanatory view of a volume Vmp of a protruding peak part.

Measurement Method of Volume Vmp of Protruding Peak Part of Regulating Blade Surface Further, as the parameter for controlling the surface roughness by the volume of the surface in addition to the line roughness Rz and Sm, the volume Vmp of the protruding peak part defined in ISO 25178 is used. The volume Vmp is the volume parameter defined as in the graph shown in FIG. 6. The load curve in the drawing is the curve indicative of the height resulting in a load area ratio of from 0% to 100%, and the load are ratio represents the area ratio of the region with a certain height or higher.

In the present embodiment, the portion with a load area ratio of 10% or less was assumed to the volume Vmp of the protruding peak part, and was observed at a magnification of 10 times using a shape analysis laser microscope (VK-X3000) manufactured by KEYENCE Co., Ltd. Thus, the load curve of the surface was determined and calculated from the measurement region of 1000 μm×1000 μm.

Low-pass filter: 5 μm

Inclination correction: effective

The volume Vmp of the protruding peak part represents the height with an aerial ratio of 10% on the protruding peak part side of the unevenness volume in the measurement region. When the convex height of the surface unevenness has a uniform height, the value of Vmp becomes larger. In other words, a large maximum height roughness Rz and a small average interval of unevenness Sm of the unevenness results in a fine and peaky unevenness. Further, a large volume Vmp of the protruding peak part results in high uniformity of the convex height. This enables efficient circulation of the deposit on the developing sleeve 4 surface. As a result, it becomes possible to suppress contamination due to accumulation of the deposit on the developing sleeve 4. Furthermore, accumulation of a small-diameter additive particle to be externally added to a toner with a small particle diameter as well as a large electrostatic attachment force particularly difficult to remove becomes stabilized, which enables long-term suppression.

Physical Properties of Blade Member

Further, in the present invention, the blade member **6*a* of the regulating blade 6 has an international rubber hardness (IRHD) of 65 to 90°. When the rubber hardness is lower than 65°, the pressure upon contact with the developing sleeve 4 is low, resulting in an excessive increase in transport force of a toner. Thus, the toner does not become a thin layer on the developing sleeve 4, which makes it impossible to apply a sufficient electric charge amount. Whereas, when the rubber hardness is higher than 90°, the pressure upon contact with the developing sleeve 4** excessively increases, so that it becomes impossible to obtain the effect of roughening of the electric charge controlled surface. The hardness of the blade member used in the present Example was 70°.

Developing Sleeve

The developing sleeve 4 of the developer bearing member in accordance with the present invention has a substrate and a surface layer, and can have additionally, for example, an intermediate layer (e.g., an elastic layer) between the substrate and the surface layer. The developing sleeve 4 of the present invention can be used as a developer bearing member for use in the image forming apparatus of an electrophotographic system. Further, the surface layer can be formed directly on the substrate surface. Below, the developing sleeve 4 of the present invention will be described in details.

Substrate

For the substrate, a known substrate in the field of the developing sleeve 4 can be used, and the shape thereof can be appropriately selected from a hollow cylindrical shape, a solid circular cylindrical shape, a belt shape, and the like. As the substrate, for example, the one obtained by forming non-magnetic metals such as aluminum, stainless steel, and brass, or an alloy thereof into a hollow cylindrical shape or a solid circular cylindrical shape, and subjecting the resulting one to polishing, and grinding can be used.

Surface Layer

The surface layer is a cured product of a resin composition including a binder resin, a conductive particle, a quaternary phosphonium salt and azo type metal complex compound. Incidentally, the binder resin has at least one structure (bond) selected from the group consisting of a —NH2 group, a =NH group, and a —NH— bond in the molecular structure. Further, the resin composition can include another additive such as an unevenness-providing particle described later.

Binder Resin

For the binder resin, there can be used a polyurethane resin, a polyamide resin, a melamine resin, a guanamine resin, a phenol resin having a NHn structure, and, a resin having a NHn structure at a portion other than the main chain such as an urethane-modified epoxy resin.

Out of these, particularly, the phenol resin having the NHn structure is high in hardness after curing, and has a high combination effect, and hence is preferably used. As the phenol resin, mention may be made of a phenol resin manufactured using a nitrogen-containing compound such as ammonia as a catalyst in the manufacturing step, which can be preferably used. Also in the present Example, a phenol resin was used as the binder resin.

Quaternary Phosphonium Salt

A quaternary phosphonium salt is necessary for stabilizing the frictional charge-providing performance with respect to the developer of the developing sleeve 4 in accordance with the present invention. The structure is preferably a salt (compound) from the viewpoint of suppressing excessive charging application.

Generally, a quaternary phosphonium salt is used as a positive charging performance charge control agent for enhancing the charging amount of the positive charging performance developer. However, in the present invention, a quaternary phosphonium salt is used in combination with the binder resin, thereby to act in the direction of relaxing the positive charging performance of the quaternary phosphonium salt itself, and to allow the effect of excessive triboelectric charging suppression with respect to a negative charging performance developer due to azo type metal complex compound addition to be remarkably exhibited.

A surface layer forming resin composition preferably has the quaternary phosphonium salt in an amount of at least 0.1 part by mass and not more than 20 parts by mass for every 100 parts by mass of the binder resin. By setting the addition amount at 0.1 part by mass or more, the excessive charging suppression effect of the developer can be exhibited with ease. By setting the addition amount at 20 parts by mass or less, the excessive charging suppression effect of the developer becomes possible with ease while keeping the durability of the surface layer.

Azo Type Metal Complex Compound

Inclusion of an azo type metal complex compound in the surface layer is necessary for applying proper triboelectric charging to the developer.

The azo type metal complex compound for use in the present invention is used with the volume-average particle diameter adjusted preferably at least 0.1 μm and not more than 20 μm, and more preferably at least 0.1 μm and not more than 10 μm. By controlling the volume-average particle diameter at at least 0.1 μm and not more than 20 μm, it is possible to disperse the azo type metal complex compound in the surface layer with ease. As a result of this, preferably, the triboelectric charging property of the surface layer becomes uniform, which can suppress the irregularity of the image density with ease.

The surface layer forming resin composition has the azo type metal complex compound preferably in an amount of at least 1 part by mass and not more than 40 parts by mass, and further preferably in an amount of at least 5 parts by mass and not more than 40 parts by mass for every 100 parts by mass of the binder resin. By setting the addition amount at 1 part by mass or more, it is possible to suppress excessive triboelectric charging application to the developer with ease. By setting the addition amount at 40 parts by mass, suppression of excessive triboelectric charging application to the developer while keeping the durability of the surface layer becomes possible with ease.

Conductive Particle

For the conductive particle, a known conductive particle in the field of the developing sleeve 4 can be appropriately selected and used. Examples of the conductive particle may include microscopic powder s of metals such as aluminum, copper, nickel, and silver, conductive metal oxides such as antimony oxide, indium oxide, tin oxide, titanium oxide, zinc oxide, molybdenum oxide, and potassium titanate, crystalline graphite, various carbon fibers, conductive carbon blacks such as furnace black, lamp black, thermal black, acetylene black, and channel black, and further metal fibers. Further, these may be used singly alone, or in combination of two or more thereof.

Out of these, carbon black and graphite are particularly preferable because of excellent dispersibility and electroconductivity. Out of these, the conductive amorphous carbon is preferable because it is particularly excellent in electroconductivity, and can provide a given conductivity to a certain degree only by being filled in a polymer material for imparting the conductivity, and being controlled in the addition amount. Further, the thixotropic effect in the case of use as a paint makes the dispersion stability/coating stability favorable. Further, the volume-average particle diameter of the conductive particle is preferably 10 nm or more from the viewpoint of the dispersion stability, and 20 μm or less from the viewpoint of the resistance uniformity of the resin composition.

Although the content of the conductive particle in the surface layer forming resin composition varies according to the particle diameter, it is preferably set at at least 1 part by mass and not more than 100 parts by mass for every 100 parts by mass of binding resin (binder resin). A content of 1 part by mass or more readily enables the improvement of reduction of the resistance of the surface layer. A content of 100 parts by mass or less readily enables preferable reduction of the resistance value without largely reducing the strength (abrasiveness) of the conductive resin. In the present Example, the amount of a conductive amorphous carbon with an average particle diameter of 4 μm was set at 50 parts by mass.

Other Additives

The resin composition is preferably allowed to contain unevenness-providing particles for unevenness formation from the viewpoints of making the surface roughness of the surface layer uniform, and keeping the proper surface roughness. The unevenness-providing particles are not required to have conductivity, and are added for the purpose of manufacturing an uneven shape on the resin composition surface. Preferably, the volume-average particle diameter of the unevenness-providing particles is 1 μm or more from the viewpoint of providing unevenness, and is 30 μm or less from the viewpoint of keeping the wear resistance of the resin composition. Further, preferably, the amount of the unevenness-providing particles to be added in the surface layer forming resin composition is 5 parts by mass or more from the viewpoint of exhibiting the effects due to addition, and 100 parts by mass or less from the viewpoint of keeping the wear resistance for every 100 parts by mass of the binder resin. In the present Example, 15-μm particles were added in an amount of 15 parts by mass.

Layer Thickness, Volume Resistance Value, and Surface Roughness of Surface Layer Preferably, the layer thickness of the surface layer is at least 4 μm and not more than 50 μm, and particularly at least 6 μm and not more than 30 μm. When the layer thickness is 4 μm or more, the surface layer can cover the substrate with ease. For this reason, it is easy to obtain the effects of manufacturing the surface layer. When the layer thickness is 50 μm or less, it is easy to control the roughness of the surface layer with the material to be added.

Preferably, the volume resistance value of the surface layer is at least 1×10-1 Ω·cm and not more than 1×103 Ω·cm, and particularly at least 1×10-1 Ω·cm and not more than 1×102 Ω·cm. When the volume resistance value is at least 1×10-1 Ω·cm and not more than 1×103 Ω·cm, it is easy to adjust the resistance due to addition of a conductive particle into the surface layer.

The roughness of the developing sleeve 4 surface, namely, the surface layer varies according to the development system. Generally, the arithmetic-mean roughness (Ra) specified by JIS B0601-2001 is preferably at least 0.15 μm and not more than 3.00 μm. When the arithmetic-mean roughness (Ra) is at least 0.15 μm and not more than 3.00 μm, it is possible to exhibit a sufficient transport force as the developing sleeve 4 with ease.

Coating Method

With the method for manufacturing the developing sleeve 4 of the present invention, a coating film of the paint containing at least a binder resin, a conductive particle, a quaternary phosphonium salt, and an azo type metal complex compound is formed on the substrate surface, and the coating film is cured (may be dried and cured), thereby to form a surface layer. Incidentally, when the materials for forming the surface layer are mixed, preferably, the materials are preferably dispersed and mixed in a solvent, which is formed into a paint. The resulting paint is coated on the substrate surface. For manufacturing the surface layer, it is preferable to use a paint obtained by mixing the binder resin, the conductive particle, the quaternary phosphonium salt, and the azo type metal complex compound in a solvent for dissolving the binder resin therein (e.g., methanol or isopropyl alcohol). In order to disperse and mix the materials, a known media dispersing apparatus such as a ball mill, a sand mill, an attritor, or a bead mill, or a known media-less dispersing apparatus using the impact type atomization method or the thin film rotating method is preferably usable. Further, as the coating methods of the resulting paint, mention may be made of known methods such as a dipping method, a spray method, a roll coating method, an electrostatic coating method, and a ring coating method. Examples of the curing method may include a heating curing method. In the present Example, a spray method was used as the coating step, and a heating curing method was used as the curing method.

Figure 7:
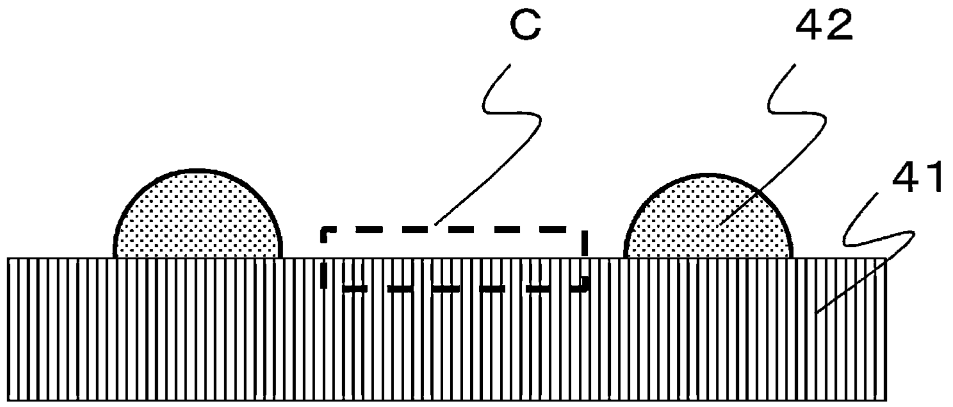
FIG. 7 is an explanatory view of the surface area ratio S/S0 indicative of the microscopic roughness of the developing sleeve surface.

Surface Area Ratio S/S0 of Portion Except for Unevenness-Providing Particles of Developing Sleeve The measuring method of the microscopic surface roughness of the developing sleeve 4 in the present Example will be described by reference to FIG. 7. FIG. 7 is a schematic view of the surface of the developing sleeve 4 surface on an enlarged scale. As the roughness of the surface layer 41 except for the unevenness-providing particles 42, the surface area ratio S/S0 of the theoretical surface area S0 in the case of the ideal plane relative to the measured surface area S of the broken line part C was measured.

In the measurement, the following method was used.

Shape analysis laser microscope (VK-X3000_ manufactured by KEYENCE Co.)

Lens: magnification of 100 times Measurement area: 40 μm×40 μm (position except for a large particle)

Measurement by dividing the photographed image at one site into four parts×average value of a total of 12 sites in longitudinal 3 areas S is the measured surface area of the surface S0 is the theoretical surface area in the case of ideal plane (40 μm×40 μm=1600 μm2)

Inclination correction: secondary curve correction

Figure 8:
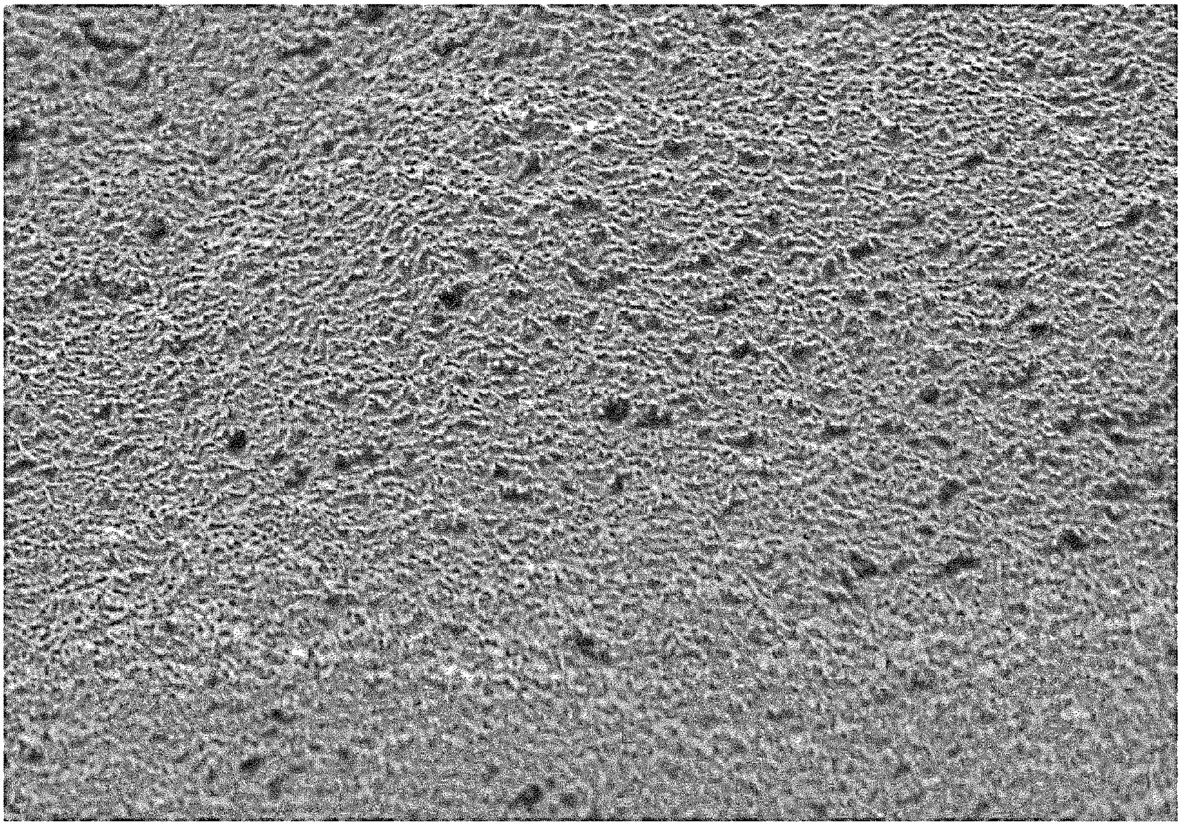
FIG. 8 is a photograph of a developing sleeve surface with a large small roughness.
Figure 9:
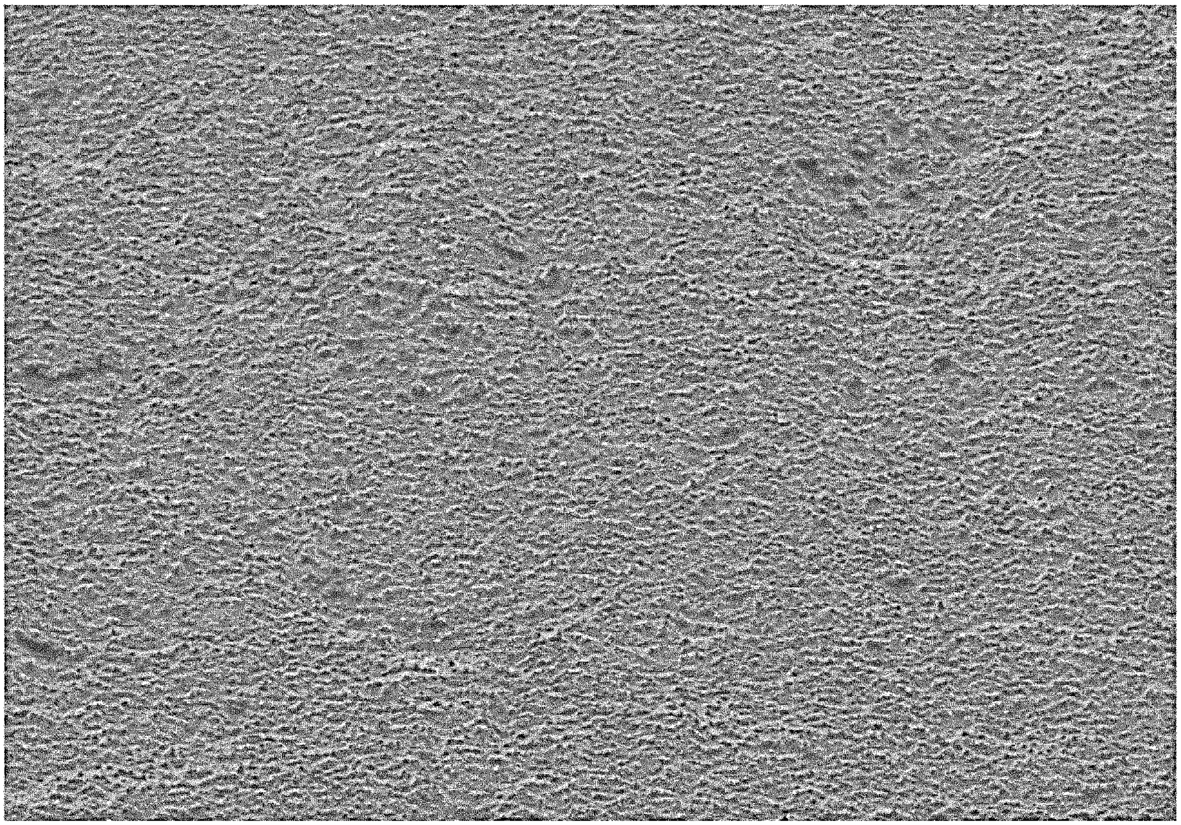
FIG. 9 is a photograph of a developing sleeve surface with a small small roughness.

The measured surface area ratio S/S0 serves as the indicator of the small roughness. Herein, FIGS. 8 and 9 show the surface SEM images of the developing sleeves 4 having different surface area ratios S/S0, respectively. Comparison between FIG. 8 and FIG. 9 indicates that the amount and the height of the microscopic unevenness are apparently different. In the present invention, the surface area ratio S/S0 was used as the method for mathematically expressing the microscopic unevenness.

The surface area ratio S/S0 of the developing sleeve 4 surface having much microscopic unevenness shown in FIG. 8 was 1.34. In contrast, the surface area ratio S/S0 of the developing sleeve 4 having less microscopic unevenness shown in FIG. 9 was 1.18.

Thus, less microscopic unevenness results in a lower surface area ratio S/S0. The surface area ratio S/S0 is the ratio of the actual surface area also including the microscopic uneven portion relative to the evaluated area area (40 μm×40 μm). When the evaluated area is a complete plane, the surface area ratio S/S0 becomes 1.00, and the larger the unevenness is, the larger the value becomes.

A close study by the present inventors has indicated as follows: when the surface area ratio S/S0 of the developing sleeve 4 surface is large, the small-diameter additive included in the developer enters the depressed portion of unevenness, and tends to be melt-adhered and accumulated. Then, a further study has proved as follows: accumulation of the small-dimeter additive contaminates the developing sleeve 4 surface, so that the charging applying ability of the toner on the developing sleeve 4 is hindered; accordingly, the problem that proper image formation cannot be performed tends to be caused. For this reason, although the surface area ratio S/S0 is preferably reduced, it is difficult to fully eliminate in terms of production. Accordingly, S/S0 is preferably reduced to the extent possible.

Developer

In the present invention, to the toner, an inorganic microscopic powder with a number average primary particle diameter of 4 to 80 nm, and more preferably 6 to 50 nm is also preferably added as a fluidizing agent. The inorganic microscopic powder is added for flowability improvement of the toner and charging uniformization of the toner particle. The treatment such as the hydrophobic treatment of the inorganic microscopic powder enables impartment of the functions such as the adjustment of the charging amount of the toner and the improvement of the environmental stability.

When the number average primary particle diameter of the inorganic microscopic powder is larger than 80 nm, or when an inorganic microscopic powder of 80 nm or less is not added, favorable toner flowability cannot be obtained, so that charging application to the toner particle tends to become ununiform. In this case, problems such as an increase in fogging, a decrease in image density, and an increase in consumption may be caused. On the other hand, when the number average primary particle diameter of the inorganic microscopic powder is smaller than 4 nm, the inorganic microscopic powder is intensified in the agglomerating property, and hence, tends to behave not as a primary particle but as an agglomerate having a strong agglomerating property and a wide particle size distribution which is difficult to disaggregate even with a disaggregation treatment. This case facilitates occurrence of image defects due to the development of the agglomerate, damaging of the image bearing member or the toner bearing member, and the like, and hence is not preferable.

As the inorganic microscopic powder for use in the present invention, silica, titanium oxide, alumina, or the like can be used. In the present Example, silica with an average primary particle diameter of 50 nm was used.

Evaluation

In the present Example, the regulating blades 6 having different surface shape profiles and the developing sleeves 4 having different surface roughnesses S/S0 were prepared. Thus, evaluation was performed in Examples 1 to 3 and Comparative Examples 1 to 3. For evaluation, a print operation was performed actually under low temperature low humidity environment (15° C./10% environment), thereby performing comparison of the presence or absence of the image defect due to contamination on the developing sleeve. Incidentally, the reason why the evaluation was performed under low temperature low humidity environment is as follows: under low temperature low humidity environment, contamination due to electrostatic deposition of a small-diameter particle with a large static electricity relative to the mass onto the developing sleeve surface tends to be caused.

The surface parameters of each regulating blade 6 used in respective Examples and Comparative Examples are shown in Table 1.

TABLE 1

| | Developing sleeve S/S0 | Regulating blade: Direction of Rough surface convex height | Rz [μm] | Sm [μm] | Vmp [ml/m$^2$] | Image evaluation results |
|---|---|---|---|---|---|---|
| Example 1 | 1.34 | Convex roughening | 5 | 75 | 0.07 | ○ |
| Comparative Example 1 | 1.34 | Concave roughening | 5 | 75 | 0.03 | X |
| Comparative Example 2 | 1.34 | Convex roughening | 2 | 150 | 0.07 | X |
| Example 2 | 1.34 | Convex roughening | 3 | 100 | 0.05 | Δ |
| Example 3 | 1.18 | Convex roughening | 3 | 100 | 0.05 | ○ |
| Comparative Example 3 | 1.18 | Convex roughening | 5 | 75 | 0.04 | X |

Example 1

Figure 10:
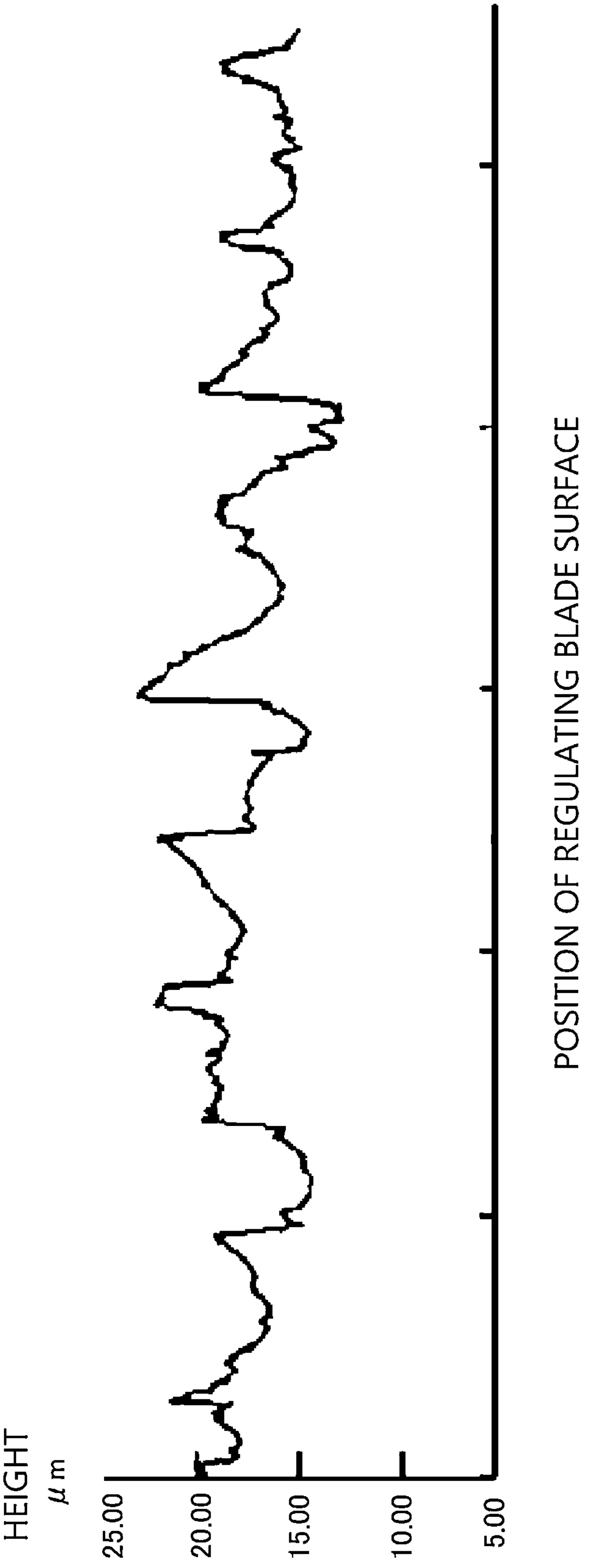
FIG. 10 is the surface shape profile of the regulating blade in accordance with Example 1.

For the regulating blade 6 used in Example 1, the mold release surface on the forming drum 18 was roughened with the shot blast method, thereby forming the surface shape. FIG. 10 is the surface shape profile thereof. The regulating blade 6 of Example 1 had a maximum height roughness Rz of 5 μm, an average interval of unevenness Sm of 75 μm, and a volume Vmp of the protruding peak part of 0.07 ml/m$^2$. Further, the developing sleeve 4 having a microscopic unevenness as large as a surface area ratio S/S0 of 1.34 was used.

Under low temperature low humidity environment, 10000 prints was performed. As a result, no image defects occurred, and the contamination on the developing sleeve 4 was not observed, either, so that the favorable state was kept. In Table, "AA" indicates that favorable results were thus obtained in image evaluation.

Comparative Example 1

Figure 11:
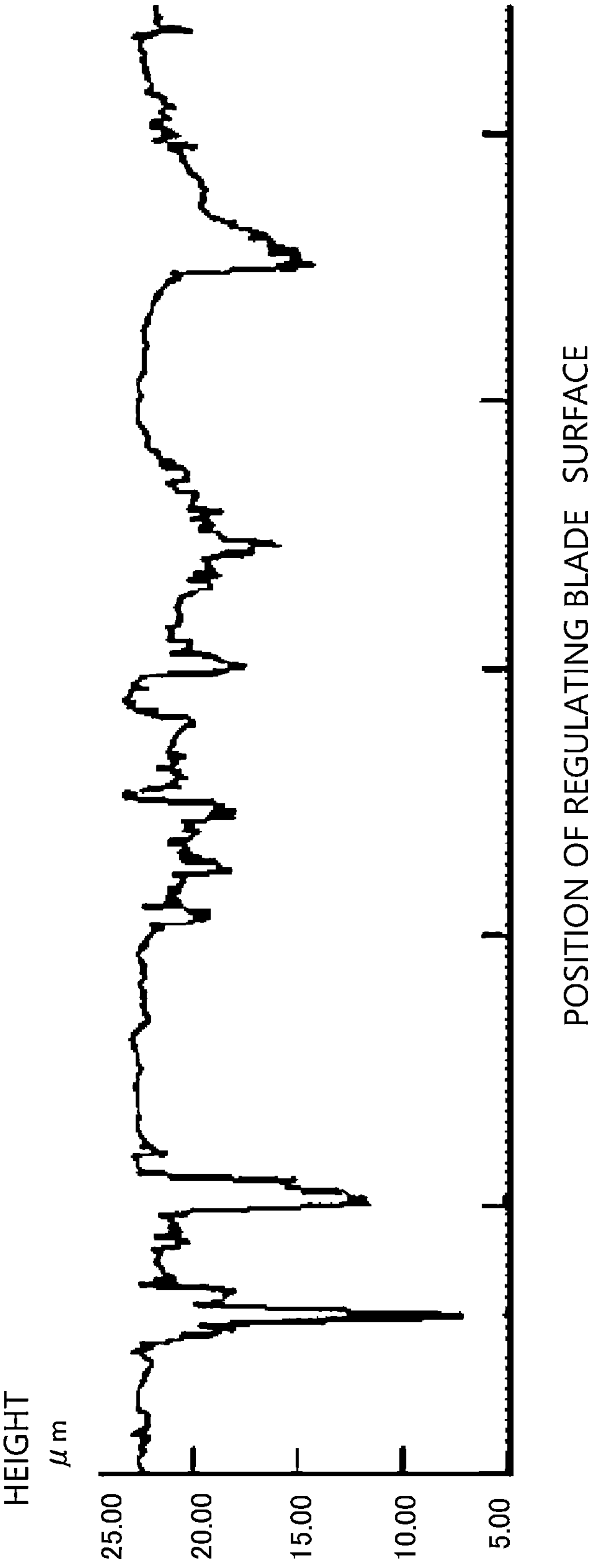
FIG. 11 is the surface shape profile of the regulating blade in accordance with Comparative Example 1.

In Comparative Example 1, there was used the regulating blade 6 manufactured with the method of roughening in the concave direction as described by reference to FIG. 5 not by roughening the mold release surface on the forming drum 18 as in Example 1, but by spraying particles in a mold release surface form. FIG. 11 shows the surface profile of the regulating blade 6 used in Comparative Example 1. The maximum height roughness Rz was 5 μm, and the average interval of unevenness Sm was 75 μm, and these values are equal to those in Example 1. On the other hand, the volume Vmp of the protruding peak part was 0.03 ml/$m^2$, and was a smaller value than that in Example 1. This indicates that the uniformity of the convex height is lower as compared with the case of Example 1. The reason for this is due to the following: while forming by convex roughening was performed in Example 1, forming by concave roughening was performed in Comparative Example 1.

As a result of performing evaluation using the regulating blade 6, image defects of reduction of density were caused from 3000 prints. The observation of the top of the developing sleeve at which the image defect of a thin density was caused, indicated that silica of microscopic powder particles added for the purpose of fluidization were deposited richly. The case where the defect is thus observed in the image evaluation results is indicated with "CC" in Table.

This is due to the following: deposition of silica of inorganic microscopic particles on the developing sleeve surface makes it impossible to properly perform charging characteristics impartment to the toner from the developing sleeve 4, resulting in the reduction of the toner charging amount (Q/M) per unit mass.

Comparison between Comparative Example 1 and Example 1 indicates the following. Namely, in both of Comparative Example 1 and Example 1, the developing sleeve 4 with a relatively lager microscopic unevenness (surface area ratio S/S0=1.34) is used. In such a case, conventionally, contamination proceeds as in Comparative Example 1, so that image defects have been often caused. However, by enhancing the uniformity of the convex height of the regulating blade surface as in Example 1, it becomes possible to suppress image defects.

Comparative Example 2

For the regulating blade 6 used in Comparative Example 2, a roughening treatment of the mold release surface by the same shot blast method as that in Example 1 was performed. The surface shape was formed by weakening the roughening treatment. For this reason, the maximum height roughness Rz was as low as 2 μm, and the average interval of unevenness Sm was as wide as 150 μm. On the other hand, the stability of the convex height was kept, and hence the volume Vmp of the protruding peak part was a value of 0.07 ml/$m^2$ equal to that of Example 1.

With the combination with the developing sleeve 4 having a large microscopic roughness in terms of a surface area ratio S/S0 of 1.34 as in Example 1, the evaluation was performed using the regulating blade 6. As a result, image defects of thin density were caused from 3000 prints as in Comparative Example 1.

This is due to the following: a low maximum height roughness Rz and a large average interval of unevenness Sm could not efficiently remove the contamination deposition of silica of microscopic particles onto the developing sleeve 4 surface having a large surface area ratio S/S0 indicative of the microscopic unevenness of the surface.

Example 2

In Example 2, as compared with Example 1, roughening of the mold release surface was slightly weakened, so that the maximum height roughness Rz was set at 3 μm, the average interval of unevenness Sm was set at 100 μm, and the volume Vmp of the protruding peak part was set at 0.05 ml/$m^2$. Evaluation was performed under the same conditions as those of Example 1 other than these.

As a result of Example 2, 10000 prints was performed. Although occurrence of remarkable image defect was not observed, the state in which contamination on the developing sleeve 4 surface had started was observed. The case where although remarkable defects were not observed in the image evaluation results, the state in which contamination had started was observed is indicated with "BB" in Table.

The results of Example 2 indicate that the regulating blade 6 desirably has a maximum height roughness Rz of 3 μm or more, and an average interval of unevenness Sm of 100 μm or less, and a volume Vmp of the protruding peak part of 0.05 ml/$m^2$ or more.

Example 3

Evaluation was performed in the same manner as in Example 2, except that the surface area ratio S/S0 indicative of the microscopic roughness of the developing sleeve 4 was as low as 1.18. Namely, evaluation was performed under the conditions where the microscopic unevenness of the surface of the developing sleeve 4 was less as compared with Example 2. As a result, 10000 prints was performed, so that no image defects were caused, and contamination onto the developing sleeve 4 surface was not observed, either.

In other words, the difference between Example 2 and Example 3 is the difference in surface area ratio S/S0 indicative of the microscopic roughness of the developing sleeve 4. It is indicated as follows: when the surface area ratio S/S0 is high, microscopic powder particles of silica or the like enter the microscopic unevenness of the developing sleeve 4 surface, so that accumulation of contamination tends to be caused.

Then, again, use of the regulating blade 6 having a maximum height roughness Rz of 3 μm or more, an average interval of unevenness Sm of 100 μm or less, and a volume Vmp of the protruding peak part of 0.05 ml/$m^2$ or more, even a developing sleeve 4 having a large surface area ratio S/S0 as in Example 2 enables suppression of the occurrence of image defects due to the contamination of the developing sleeve 4.

Comparative Example 3

In the Comparative Example 3, the developing sleeve 4 having a surface area ratio S/S0 of as low as 1.18 was used. Further, a regulating blade 6 with unevenness being microscopic and large, as with a regulating blade 6 having a maximum height roughness Rz of 5 μm, and an average interval of unevenness Sm of 75 μm was used. On the other hand, a regulating blade 6 having a volume Vmp of the protruding peak part as small as 0.04 $ml/m^2$ was used. This indicates as follows: the unevenness when the roughness of the surface of the regulating blade 6 is viewed in surface is ununiform, and, although high convexes are present in some regions, there are portions with microscopic unevenness as viewed in the entire surface.

As a result of performing evaluation under the conditions, image defects of thin density in streaks occurred in 3000 prints. Then, the top of the developing sleeve 4 was observed, and was found to be partially contaminated with silica of small-diameter particles. Thus, even when the maximum height roughness Rz is large, and the average interval of unevenness Sm is small, deposition of contamination may be locally caused when the roughness is ununiform as the surface roughness.

More particularly, the maximum height roughness Rz is the indicator of prescribing the difference in height of the unevenness in the vertical direction at the regulating blade surface, and the average interval of unevenness Sm is the indicator of prescribing the interval of the unevenness. Even when the maximum height roughness Rz is large, convexes may be formed locally. The entire convex height is not necessarily prescribed to be uniform as viewed in surface. Further, even when the average interval of unevenness Sm is small in addition to the prescription of the maximum height roughness Rz, as described previously, high convexes and gently low convexes may be locally formed at a prescribed interval, and convexes with a desirable height, or higher height are not necessarily formed at a prescribed interval.

Namely, even when the maximum height roughness Rz is large, and the average interval of unevenness Sm is small, for example, it is considered as follows: although some maximum convex heights are large, the convex height as viewed in surface may be ununiform. In this case, particularly, melt adhesion onto the developing sleeve by an additive with a smaller particle diameter than that of the developer may not be able to be removed with stability. For this reason, the developing sleeve surface is gradually contaminated for deposition, so that the charging uniformity of the developer to be borne is not retained, which may cause image defects. Therefore, it is important that the unevenness when the roughness of the surface of the regulating blade 6 is viewed in surface is formed uniform. By prescribing the maximum height roughness Rz, the average interval of unevenness Sm, and the volume Vmp of the protruding peak part, it is possible to suppress the occurrence of image defects due to the contamination of the developing sleeve 4.

Up to this point, evaluation performed using Examples 1 to 3 and Comparative Examples 1 to 3 has proved that it is preferable to use the regulating blade 6 having a maximum height roughness Rz as high as 3 μm or more, an unevenness with a density as high as an average interval of unevenness Sm of 100 μm or less, and, an uniformity of the in-plane unevenness as high as a volume Vmp of the protruding peak part of 0.05 $ml/m^2$ or more. By doing so, it becomes possible to suppress the volume of the contamination on the developing sleeve 4 surface by microscopic particles over a long period with stability.

Further, when as an additional study, the maximum height roughness Rz of the regulating blade 6 was increased up to 20 μm toward a further increase, deposition of contamination on the developing sleeve 4 was not observed, but the toner coating state (M/S) on the developing sleeve 4 became ununiform, resulting in extremely slight occurrence of image density non-uniformity in the longitudinal direction. Further, evaluation was performed with a maximum height roughness Rz of 3 μm or more, and an average interval of unevenness Sm of down to 30 μm as the minimum, resulting in no occurrence of image defects. On the other hand, the regulating blade 6 with an average interval of unevenness Sm of less than 30 μm while keeping a maximum height roughness of 5 μm or more could not be manufactured, and has been yet to be observed. In order to keep the stability of the toner coat on the developing sleeve 4, the average interval of unevenness Sm is considered to be preferably 30 μm or more.

Accordingly, by setting the maximum height roughness Rz of the regulating blade 6 at 3 μm or more and less than 20 μm, the average interval of unevenness Sm at at least 30 μm and not more than 100 μm, and the volume Vmp of the protruding peak part at 0.05 $ml/m^2$ or more, it becomes possible to efficiently remove microscopic powder particles even when the microscopic powder particles are deposited on the developing sleeve 4 surface by an electrostatic force even in the case where the surface area ratio S/S0 indicative of the microscopic roughness of the developing sleeve 4 surface is high. Thus, it is possible to suppress the deposition of microscopic powder particles hindering favorable image formation, and to enable stable image formation over a long period.

Further, as another additional study, the relationship between the surface area ratio S/S0 of the developing sleeve 4 and the regulating blade 6 was also considered. Herein, it is understood that although a larger surface area ratio S/S0 results in a higher durability of the developing sleeve 4, contamination tends to proceed. For example, when the case of a surface area ratio S/S0=1.34 and the case of a surface area ratio S/S0=1.18 are compared, while the former has higher durability, contamination is more likely to proceed. A study by the present inventors has revealed that contamination tends to proceed when the surface area ratio S/S0 is 1.20 or more. However, with the configuration of the regulating blade 6 of the present invention, even when such a developing sleeve 4 which tends to be contaminated (typically, S/S0≥ 1.20) is used, the image defects can be suppressed.

As described up to this point, in preferable Examples of the present invention, in addition to the specification of the unevenness height in the vertical direction of the surface roughness and the interval thereof, the volume of the protruding peak part in the three-dimensional surface roughness is defined within a preferable range. As a result, it became possible to provide the regulating blade 6 capable of suppressing the melt adhesion onto the developing sleeve 4 for a long period, and stabilizing the image quality in a developing apparatus due to a developer additive with a small particle diameter and a large electrostatic attachment force for.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-200126, filed on Dec. 15, 2022, which is hereby incorporated by reference wherein in its entirety.

What is claimed is:

1. A developing apparatus comprising:

a developer bearing member configured to bear a developer; and a regulating member configured to come in contact with the developer bearing member, and regulate a thickness of a layer of the developer borne on the developer bearing member, wherein $$3 \leq Rz < 20 (\mu m),$$

$$30 \leq Sm \leq 100 (\mu m), \text{ and}$$

$$Vmp \geq 0.05 \text{ ml/m}^2 \text{ are satisfied}$$

where Rz represents a maximum height roughness, and Sm represents an average interval of unevenness in a portion of a surface of the regulating member that comes in contact with the developer bearing member, and Vmp represents a volume in an initial state of a protruding peak part in a three-dimensional surface roughness defined in ISO 25178.

2. The developing apparatus according to claim 1, wherein the portion of the surface of the regulating member that comes in contact with the developer bearing member is formed to have a rough surface in a convex direction by a die surface-roughened in a concave direction.

3. The developing apparatus according to claim 1, wherein the developer includes an inorganic microscopic powder having an average particle diameter of 50 nm or less, and subjected to a hydrophobic treatment.

4. The developing apparatus according to claim 1, wherein the developer bearing member includes an unevenness-providing particle having a larger diameter than the maximum height roughness Rz of the surface of the regulating member, and $$S/S0 \geq 1.18 \text{ is satisfied}$$

where S represents a measured surface area of a surface of the developer bearing member, S0 represents a theoretical surface area when the surface of the developer bearing member is assumed to be an ideal plane, and S/S0 represents a surface area ratio of a portion except for the unevenness-providing particle in the surface of the developer bearing member.

5. The developing apparatus according to claim 4, wherein at the surface of the developer bearing member, $$S/S0 \geq 1.20 \text{ is satisfied.}$$

6. A process cartridge configured to be detachable relative to an apparatus main body of an image forming apparatus, and comprising the developing apparatus according to claim 1.

7. An image forming apparatus comprising:

an image bearing member configured to form an electrostatic latent image on a surface thereof; and a developing apparatus configured to supply a developer to the image bearing member, and develop the electrostatic latent image, wherein the developing apparatus is the developing apparatus according to claim 1.

* * * * *